MONOFLUORO-β-KETOACETANILIDE COUPLERS FOR COLOR PHOTOGRAPHY

Anthony Loria, Ilmari F. Salminen, and Arnold Weissberger, Rochester, N.Y., assignors to Eastman Kodak Company, Rochester, N.Y., a corporation of New Jersey
No Drawing. Filed Aug. 24, 1960, Ser. No. 51,549
12 Claims. (Cl. 260—476)

This invention relates to photography and particularly to a new class of two-equivalent yellow-dye-forming coupler compounds, their prepartion by a novel process, and their use in color photography.

The formation of colored photographic images in multilayer elements by coupling the oxidation products of aromatic amino color developing agents with color-forming or coupling compounds is well known. In these processes, the subtractive process for color formation is ordinarily used; and the image dyes are intended to be of the complementary primary colors, cyan or blue-green, magenta, and yellow. The couplers which produce the cyan dyes are usually phenols or naphthols, those producing the magenta dyes are ordinarily pyrazolones, and those producing the yellow dyes are ordinarily compounds containing a methylene group having 2 carbonyl groups attached to it. In multilayer elements for color photography, the cyan couplers are usually incorporated in the red-sensitive layer, the magenta coupler in the green-sensitive layer, and the yellow coupler in the blue-sensitive layer. The dyes produced by coupling are azomethine, indamines, or indophenols, depending upon the composition of the coupler and of the developer.

Many of the known couplers are unstable and when incorporated in photographic emulsions are subject to discoloration, an effect called "printout" when caused by exposure to light over a period of time, or "yellowing," an effect produced by continued exposure of the coupler to heat.

The yellow dyes produced from many of the well known couplers are not as stable as desired when exposed to heat or light for periods of time.

Conventional acetoacetanilide yellow-dye-forming couplers have an active methylene group which reacts with oxidized color developer during color development to produce the dyes. These couplers are four-equivalent couplers because they are characterized by requiring the development of four exposed silver halide molecules in order to produce one molecule of dye from a coupler molecule and a developer molecule.

Two-equivalent acetoacetanilide couplers having one of the hydrogen atoms of the active methylene group of each molecule replaced with a chlorine atom have the advantage over the conventional couplers in that they require the development of only two silver halide molecules instead of four to produce a molecule of dye. This advantage of the α-chloro couplers is frequently outweighed by the serious disadvantage of a high dye stain produced by these couplers.

Attempts to produce α-fluoroacetanilide type couplers have previously been unsuccessful. Available methods for preparing these compounds have been tedious and uncertain. Fluorinating agents tend to difluorinate the active methylene group of these compounds. The attempt to prepare monofluoro derivatives by limiting the amount of fluorinating agent used with respect to the active methylene compound yields only difluorinated and unfluorinated products.

It is, therefore, an object of our invention to provide a novel method for preparing yellow-dye-forming couplers having one hydrogen per active methylene group replaced with a fluorine atom.

Another object is to provide a novel class of two-equivalent yellow-dye-forming couplers having a monofluorinated active methylene group.

Another object is to provide a novel class of two-equivalent couplers which has all the advantages of the corresponding monochloro two-equivalent couplers without the disadvantages of the dye stain that characterize many of the monochloro two-equivalent couplers.

Another object is to provide a novel class of yellow-dye-forming couplers for color photography that have good stability and also relatively little "printout" and "yellowing" upon prolonged exposure to light, heat, and humidity.

Another object is to provide a novel class of yellow-dye-forming couplers which produce dyes upon reaction with oxidized color developer, that have valuable spectral absorption properties for color photography.

Still further objects will become apparent from the following specification and claims.

We have discovered that these objects and other objects can be accomplished by using our novel synthesis for making the novel yellow-dye-forming two-equivalent couplers of our invention having the formula:

(I) 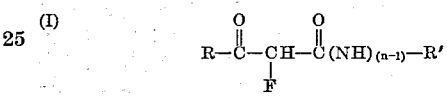

in which R represents an alkyl group having from 1 to 32 carbon atoms which may be a normal alkyl radical having from 1 to 18 carbon atoms, e.g., methyl, propyl, hexyl, octyl, dodecyl, pentadecyl, octadecyl, etc., a secondary alkyl radical in which the secondary carbon atom is attached directly to the carbonyl radical and has attached to it two alkyl radicals each of which may have from 1 to 18 carbon atoms, as defined above, provided that the R group does not have more than a total of 32 carbon atoms, and includes such groups as 1-methylheptadecyl, 1-butylheptadecyl, 1-decylheptadecyl, 1-dodecylheptadecyl, 1- pentadecylhexadecyl, etc., a tertiary alkyl radical in which the tertiary carbon atom is preferably attached directly to the carbonyl radical and has attached to it three alkyl radicals each of which may have from 1 to 18 carbon atoms as defined above, provided that the R group does not have more than a total of 32 carbon atoms and in which one or two of these alkyl radicals attached to the tertiary carbon may themselves be secondary or tertiary alkyl radicals having from 1 to 18 carbon atoms, and includes such groups as α-pivalyl, 1,1 - dimethylpropyl, 1,1 - dibutylheptadecyl, 1 - butyl - 1 - pentadecyl - heptadecyl, 1,1 - diisobutylheptadecyl, 1,1 - di - tert - butylheptadecyl, etc., a tertiary alkyl radical in which one, two, or three of the alkyl groups defined above that are attached to the tertiary carbon atom are replaced by alkoxy radicals having from 1 to 18 carbon atoms such as methoxy, ethoxy, propoxy, butoxy, pentoxy, hexoxy, octoxy, nonoxy, decoxy, dodecoxy, tridecoxy, tetradecoxy, pentadecoxy, hexadecoxy, octadecoxy, etc., or alkoxyalkyl radicals having from 1 to 18 carbon atoms in which the alkoxy and alkyl radicals are among those defined above such as methoxymethyl, ethoxymethyl, propoxymethyl, butoxymethyl, hexoxymethyl, decoxymethyl, pentadecoxymethyl, methoxypropyl, methoxyhexyl, methoxyoctyl, methoxydecyl, methoxydodecyl, methoxypentadecyl, nonoxynonyl, etc., and include such groups as 1-methoxy-1-butylhexoxy, 1,1 - dioctoxyhexadecyl, 1 - decoxy - 1 - octoxyhexadecyl, 1-methoxyethyl - 1 - butoxyethylhexadecyl, etc., or R represents a cyclohexyl radical substituted with an alkyl radical, an alkoxy radical, an alkoxyalkyl radical, each having from 1 to 18 carbon atoms as described above, for example, 1 - methylcyclohexyl, 1 - ethylcyclohexyl, 1-propylcyclohexyl, 1-octylcyclohexyl, 1-dodecylcyclohexyl, 1 - pentadecylcyclohexyl, 1 - octadecylcyclohexyl, 2 - methylcyclohexyl, 3 - ethylcyclohexyl, 4-octylcyclohexyl, etc., 1 - methoxycyclohexyl, 1-ethoxycyclohexyl, 1 - propoxycyclohexyl, 1 - nonoxycyclohexyl, 1 - octadecoxycyclohexyl, 2 - butoxycyclohexyl, etc., 1 - methoxymethylcyclohexyl, 1 - propoxymethylcyclohexyl, 1 - decoxymethylcyclohexyl, 1 - pentoxymethylcyclohexyl, 1 - methoxydecylcyclohexyl, 1 - nonoxynonylcyclohexyl, 2 - nonoxynonylcyclohexyl, 3 - nonoxydecylcyclohexyl, etc., or a cyclohexyl radical substituted with an aryl group such as 1-phenylcyclohexyl, 1 - tolylcyclohexyl, etc., or R represents a bicycloalkyl radical such as a terpenyl radical, e.g., 7,7-dimethylnorbornyl, a 2-alkyl-7,7-dimethylnorbornyl, a 2-alkoxy-7,7-dimethylnorbornyl, a 2-alkoxyalkyl-7,7-dimethylnorbornyl, preferably although not necessarily attached to the carbonyl group through the bridgehead carbon, and in which the alkyl, alkoxy, and alkoxyalkyl substituents may each have from 1 to 18 carbon atoms as defined above, such as 2-methyl-7,7-dimethylnorbornyl, 2-octyl-7,7 - dimethylnorbornyl, 2 - octadecyl - 7,7 - dimethylnorbornyl, etc., 2 - ethoxy - 7,7 - dimethylnorbornyl, 2 - nonoxy - 7,7-dimethylnorbornyl, 2 - octadecoxy - 7,7-dimethylnorbornyl, etc., 2 - methoxybutyl - 7,7 - dimethylnorbornyl, 2 - octoxydecyl - 7,7 - dimethylnorbornyl, etc., a 2-aryl-7,7-dimethylnorbornyl such as 2-phenyl-7,7 - dimethylnorbornyl, 2 - tolyl - 7,7 - dimethylnorbornyl, etc., an aryl radical, e.g., phenyl, an alkphenyl radical in which the alkyl radical has from 1 to 18 carbon atoms, e.g., 3-methylphenyl, 2-butylphenyl, 4-octylphenyl, 2-dodecylphenyl, 3-octadecylphenyl, etc., an alkoxyphenyl radical in which the alkyl group has from 1 to 18 carbon atoms, e.g., 2-methoxyphenyl, 2-propoxyphenyl, 2-hexoxyphenyl, 2-nonoxyphenyl, 2-decoxyphenyl, 2-octadecoxyphenyl, etc., a halophenyl such as 2-chlorophenyl, 2,4,6 - tribromophenyl, 2,4,6 - trifluorophenyl, etc.; where *n* is the integer 1 or 2; and R' represents an aryl radical such as phenyl, alkoxyphenyl in which the alkyl radical may have from 1 to 18 carbon atoms as defined above for R, halophenyl radicals such as 2-chlorophenyl, 2,4-dichlorophenyl, 2,4,6-trichlorophenyl, the corresponding bromo- and corresponding fluorophenyl radicals, etc., a 2-halo-5-alkamidophenyl radical, e.g., 2-chloro - 5 - [α - (2,4 - di - tert - amylphenoxy)acetamido] phenyl, 2-chloro - 5 - [α-(2,4 - di - tert-amylphenoxy)butyramido]phenyl, 2 - chloro - 5 - [α-(2,4-di-tert-amylphenoxy)amylamido]phenyl, 2 - chloro - 5 - [γ-(2,4-di-tert - amylphenoxy)butyramido]phenyl, 2 - chloro - 5-(4-methylphenylsulfonamido)phenyl, 2 - fluoro - 5 - (N-hexylamido)phenyl, etc., a 2-methoxyl-5-alkamidophenyl radical, e.g., 2-methoxy - 5 - (2,4-di-tert-amylphenoxy) acetamidophenyl, 2-methoxy - 5 - [α-(2,4 - di - tert-amylphenoxy)butyramido]phenyl, etc., a 4 - alkamidophenyl radical, e.g., 4-(2,4-di-tert-amylphenoxy)acetamidophenyl, 4-[γ-(2,4 - di - tert - amylphenoxy)butyramido]phenyl, etc., a 4-methoxyphenyl radical, e.g., 4-[N-(γ-phenylpropyl) - N - (p-tolyl) - carbamylmethoxy]phenyl, 4-[N-(γ-phenylhexyl) - N - (p - tolyl)carbamylmethoxy]phenyl, etc., a 4-sulfamylphenyl radical, e.g., 4-[N-(γ-phenylpropyl) - N - (p-tolyl)sulfamyl]phenyl, 4-[N-(phenylethyl) - N - (p-tolyl)sulfamyl]phenyl, etc., a 2-chloro-5-sulfonamidophenyl radical., e.g., 2-chloro-5-(p-toluenesulfonamido)phenyl, 2 - chloro - 5 - (benzenesulfonamido)phenyl, etc., a 3,5-dicarboxyphenyl radical, esters of 3,5-dicarboxyphenyl radicals, e.g., 3,5-dicarbomethoxyphenyl, 3,5-dicarbohexoxyphenyl, 3,5-dicarbododecoxyphenyl, 3,5 - dicarbopentadecoxyphenyl, 3,5 - dicarbooctadecoxyphenyl, etc., a 2-phenoxy-5-carbamylphenyl radical, e.g., 2-(2,4-di-tert-amylphenoxy) - 5 - (3,5 - dicarbomethoxyphenylcarbamyl)phenyl, 2-(2,4 - di - tert - amylphenoxy) - 5 - (N-morpholinocarbonyl)phenyl, etc., a 3,5-dicarbamylphenyl radical, etc., or an alkyl group of 1 to 18 carbon atoms, preferably a long-chain alkyl of 10 to 18 carbon atoms, e.g., stearyl an alkoxy group having from 1 to 18 carbon atoms.

The following specific examples are representative of our couplers and will serve to illustrate them.

COUPLER 1

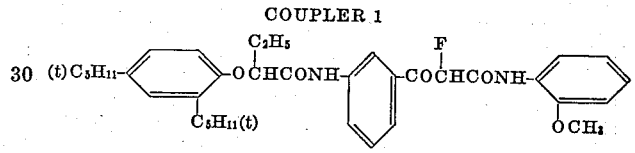

α-{3-[α-(2,4-di-tert-amylphenoxy)butyramido]benzoyl}-α-fluoro-2-methoxyacetanilide

COUPLER 2

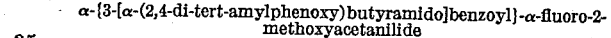

α-Benzoyl-α-fluoroacetanilide

COUPLER 3

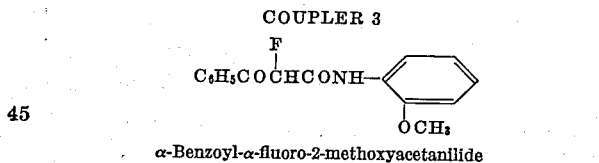

α-Benzoyl-α-fluoro-2-methoxyacetanilide

COUPLER 4

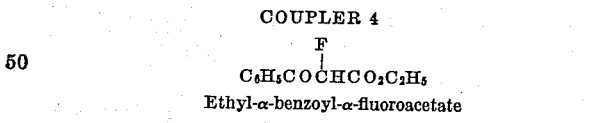

Ethyl-α-benzoyl-α-fluoroacetate

COUPLER 5

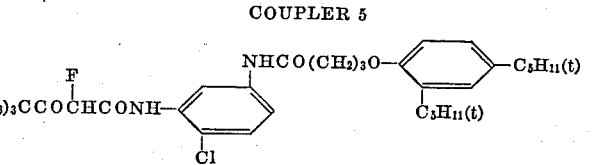

α-Fluoro-α-pivalyl-5-[γ-(2,4-di-tert-amylphenoxy)butyramido]-2-chloroacetanilide

COUPLER 6

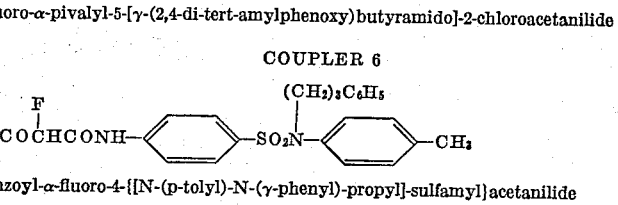

α-Benzoyl-α-fluoro-4-{[N-(p-tolyl)-N-(γ-phenyl)-propyl]-sulfamyl}acetanilide

COUPLER 7

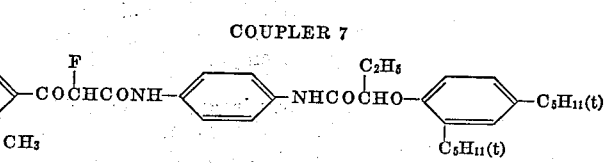

α-Fluoro-α-(o-methoxybenzoyl)-4-[α-(di-tert-amylphenoxy)-n-butyramido]acetanilide According to our invention our couplers are prepared by treating the alkali metal enolate (e.g., the sodium enolate) of the parent coupler having the formula:

(II)  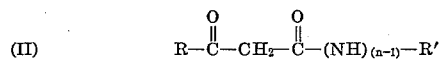

wherein R, R', and n have the values given above, with perchloryl fluoride under conditions which favor the separation of the monofluoro derivative having the Formula I from the reaction mixture immediately on formation. This is accomplished by adding a solution of the sodium salt of the parent coupler slowly to perchloryl fluoride dissolved in methyl alcohol and maintaining the reacting mixture at −45° to −20° C. by an acetone-Dry Ice bath. The monofluoride coupler precipitates out of the solution as it is formed with the result that none of the difluorinated compound is produced. The reaction mixture is then allowed to warm up to about 10° over a period of time during which the monofluorinated coupler dissolves, and then the mixture is added to ice water. The monofluorinated coupler which precipitates is filtered, washed with cold water, and air dried.

The following specific synthesis of our couplers will serve to further illustrate the process of our invention.

*Example I*

Coupler 1 was prepared as follows:
To a 1-liter flask set in an acetone-Dry Ice cooling bath and equipped with a gas inlet tube, a thermometer, a condenser, and a stirrer, 300 ml. of methyl alcohol was added and the temperature brought down to about −20° C. At this temperature 5.5 g. (0.055 mole) of perchloryl fluoride was passed into the methyl alcohol in about 15 minutes.

The gas inlet tube was replaced by a dropping funnel and a solution prepared by reacting 2.7 g. (0.05 mole) of sodium methoxide with 29.3 g. (0.05 mole) of a α-{3-[α-(2,4-di - tert - amylphenoxy)butyramido]benzoyl} - 2-methoxyacetanilide (the parent coupler of Coupler 1) in 125 ml. of methyl alcohol was added in 30 minutes with vigorous stirring while the temperature was kept at −20° to −30° C. Stirring was continued for 10 minutes longer after the addition was completed, and the mixture allowed to come to room temperature.

An equal volume of ice water was added to the reaction mixture, and the precipitate which formed was collected on a Buchner funnel, washed well with cold water, and air dried. The dry product was crystallized from isopropyl alcohol twice.

The product, Coupler 1, melted at 62° to 64° C. and gave the following analytical results:

Calculated for $C_{36}H_{45}FN_2O_5$: C, 71.4%; H, 7.5%; F, 3.2%; N, 4.6%. Found: C, 71.5%; H, 7.9%; F, 3.4%; N, 4.5%.

*Example II*

Coupler 2 was prepared by a similar process in which an equimolar amount of α-benzoylacetanilide was used in place of the parent coupler of Coupler 1. The product of this reaction after being crystallized twice from isopropyl alcohol had a melting point from 86° to 88° C. and gave the following analysis:

Calculated for $C_{15}H_{12}FNO_2$: C, 70.0%; H, 4.6%; F, 7.4%; N, 5.4%. Found: C, 70.4%; H, 5.0%; F, 7.7%; N, 5.7%.

*Example III*

Coupler 3 was prepared by the process of Example I by substituting an equimolar amount of α-benzoyl-2-methoxyacetanilide for the parent Coupler 1 in Example I. The product of this reaction was crystallized from ethyl alcohol to give a material that melted at 104° to 107° C. and the following analysis:

Calculated for $C_{16}H_{14}FNO_3$: C, 67.0%; H, 4.9%; F, 6.6%; N, 4.9%. Found: C, 67.3%; H, 5.2%; F, 6.9%; N, 4.8%.

*Example IV*

Coupler 4 was prepared similarly by substituting an equimolar amount of ethyl-α-benzoylacetate for the parent coupler of Coupler 1 in Example I. The product of this reation boiled at 100° to 105° C./1 mm. Hg and melted at 33° to 35° C. after crystallization from hexane. It had the following analysis:

Calculated for $C_{11}H_{11}FO_3$: C, 63.0%; H, 5.2%; F, 9.1%. Found: C, 63.3%; H, 5.7%; F, 9.4%.

*Example V*

Coupler 5 was produced by the process of Example I in which an equimolar amount of α-pivalyl-5-[γ-(2,4-di-tert-amylphenoxy)butyramido] - 2 - chloroacetanilide was used as the parent coupler in place of the parent coupler of Example I. The product of this reaction was crystallized twice from methyl alcohol to give a coupler which melted at 87° to 92° C. and gave the following analysis:

Calculated for $C_{33}H_{46}ClFN_2O_4$: C, 67.3%; H, 7.8%; Cl, 6.0%; F, 3.2%; N, 4.8%. Found: C, 66.6%; H, 8.2%; Cl, 5.9%; F, 3.4%; N, 4.7%.

*Example VI*

Coupler 6 was prepared by the reaction process of Example I in which an equimolar amount of α-benzoyl-4-{[N-(p-tolyl) - N - (γ-penyl)propyl]sulfamyl}acetanilide was used as the parent coupler. The product of this reaction was crystallized twice from ethyl alcohol to give a coupler which melted at 141° to 146° C. and gave the following analysis:

Calculated for $C_{31}H_{29}FN_2O_4S$: C, 68.4%; H, 5.3%; F, 3.5%; N, 5.2%; S, 5.9%. Found: C, 68.2%; H, 5.7%; F, 3.4%; N, 5.3%; S, 6.0%.

*Example VII*

Coupler 7 was prepared similarly by using an equimolar qantity of α-(o-methoxybenzoyl)-4 - [α - (di - tert-amylphenoxy) - n - butyramido]acetanilide as the parent coupler. The product of this reaction was crystallized from acetonitrile to give a coupler which melted at 81° to 84° C. and had the following analysis:

Calculated for $C_{36}H_{45}FN_2O_5$: C, 71.6%; H, 7.5%; F, 3.2%; N, 4.5%. Found: C, 72.0%; H, 7.8%; F, 3.4%; N, 4.6%.

The synthesis of the parent couplers used in Examples I to VII is given in Weissberger U.S. Patent 2,350,138, issued May 30, 1944; Weissberger et al. U.S. Patent 2,407,210, issued September 3, 1946; and in Weissberger and Kibler U.S. application, Serial No. 25,295, filed April 28, 1960, now abandoned.

Some of the couplers of our invention are diffusible and are especially suited for use in developer solutions for developing the yellow-dye image in exposed color photographic film which does not contain incorporated yellow coupler. Our couplers of this type are illustrated by Couplers 2, 3, and 4.

The other couplers of our invention are nondiffusing and are especially suited for incorporation in silver halide emulsion layers for color photography. Upon exposure, such emulsions containing our couplers are developed with conventional color developing solutions which do not contain yellow forming coupler.

The following composition illuserates a developer solution in which one of our couplers is used.

DEVELOPER 1

| | Grams |
|---|---|
| Sodium hydroxide | 4.0 |
| Sodium sulfite | 10.0 |
| α-benzoyl-α-fluoroacetanilide (Coupler 2) | 1.5 |
| 2-amino-5-diethylaminotoluene hydrochloride | 2.5 |
| Water to 1 liter. | |

The developer composition may be varied from that given above depending upon the specific requirements that the color developer must satisfy. For example, it is possible to change the concentrations of the constituents in the formula of Developer 1. It is also possible to add other constituents to such a developer. For example, any of the well-known anti-foggants, silver halide solvents, competing couplers, competing developers, and other constituents such as potassium bromide, potassium iodide, sodium carbonate, and sodium sulfate may be incorporated in developer compositions containing our couplers. Any color-forming developer containing a primary aromatic amino developing agent may be used. These include developers having two primary amino groups as well as those having one of the amino groups substituted, or having substituents in the ring such as alkylphenylenediamines and alkyltoluenediamines. These compounds are usually used in the salt form such as the hydrochloride and the sulfate which are more stable than the amines themselves. Suitable developing agents are diethyl-p-phenylenediamine hydrochloride, monomethyl-p-phenylenediamine hydrochloride, dimethyl-p-phenylenediamine hydrochloride, 2-amino-5-diethylaminotoluene hydrochloride, N-ethyl-N-($\beta$-methanesulfonamidoethyl)-4-aminoaniline sulfate, N-ethyl-N-($\beta$-methanesulfonamidoethyl)-3-methyl-4-aminoaniline sulfate, and 4-amino-N-ethyl-N-($\beta$-methanesulfonamidoethyl)-m-toluidine sesquisulfate monohydrate. The p-aminophenols and their substitution products may also be used where the amino group is unsubstituted. All of these groups have unsubstituted amino groups which enable the oxidation products of the developer to couple with the color-forming compounds to form a dye image.

The following example will serve to illustrate a typical way in which our couplers are used in color developers for developing yellow dye images in exposed silver halide emulsion layers.

Example VIII

A film coated with an ordinary silver bromoiodide emulsion for color photography was exposed under an image at 125th of a second with light having a color temperature of 3,000° K. and developed for ten minutes in a developer having the composition of Developer 1. Then the silver image and the residual silver halide was removed by treating the film for five minutes in a conventional potassium ferricyanide-potassium bromide bleach followed by fixing in a conventional hypo fixing bath for five minutes. After a ten minute final wash, the film was dried. The result was a negative dye image having a $\gamma$-max value of 440 m$\mu$.

Similarly, other diffusible couplers of our invention have been used in developer solutions such as Developer 1 to develop yellow dye images as in Example VIII. For example, a developer solution containing Coupler 3 produced a dye image having a $\gamma$-max value of 447 m$\mu$, and Coupler 4 a dye image having a $\gamma$-max value of 450 m$\mu$.

The couplers of our invention which are adapted especially for incorporation in emulsion layers for color photography are particularly valuable because in this application full advantage can be made of their low "printout" and low "yellowing" tendencies and their two-equivalent characteristic. Emulsions containing our couplers are coated on transparent supports, such as glass, cellulose esters, etc., or on a nontransparent reflecting material, such as paper, opaque cellulose esters, etc.

Our couplers are incorporated in light-sensitive silver halide emulsion layers as described in Mannes and Godowsky U.S. Patent 2,304,940 or in Jelley and Vittum U.S. Patent 2,322,027. A wide range of coupler to coupler incorporating solvent ratios may be used. For example, this ratio may range from 1:3 to 1:0. The preferred range of coupler to coupler solvent ratios is from 1:½ to 1:¼.

Any of the standard emulsion addenda may be used in the emulsions containing our couplers such as the emulsion addenda disclosed in Dann and Gates U.S. application, Serial No. 797,577, filed March 6, 1959 now U.S. Patent 3,062,646, issued November 6, 1962.

Photographic emulsions containing our couplers are color developed by developer solutions containing any of the well-known primary aromatic amino silver halide developing agents such as have been described above. Variations in concentration and composition such as is described for Developer 1 may also be made in developers used for developing emulsions containing our couplers.

Typical developers containing these developing agents are as follows:

DEVELOPER 2

|  | G. |
|---|---|
| 2-amino-5-diethylaminotoluene hydrochloride | 2.5 |
| Sodium sulfite (anhydrous) | 5.0 |
| Sodium carbonate (anhydrous) | 20.0 |
| Potassium bromide | 2.0 |

Water to 1 liter.

DEVELOPER 3

|  | G. |
|---|---|
| N-ethyl-N-($\beta$-methanesulfonamidoethyl)-3-methyl 4-aminoaniline sulfate | 2.0 |
| Sodium sulfite (anhydrous) | .6 |
| Sodium carbonate (anhydrous) | 30.0 |

Water to 1 liter.

Our invention is further illustrated by the following specific examples showing how our couplers are incorporated in photographic emulsions and then used to produce yellow dye images having valuable light absorption characteristics for color photography.

Example IX

.5 ml. of a dispersion of 1 g. of Coupler 1 and 0.5 g. of di-n-butylphthalate coupler solvent in 2.2 g. of gelatin was mixed with 5 ml. of a conventional medium-speed silver bromoiodide emulsion, and the mixture was coated on a suitably-subbed cellulose acetate support. After being dried, the coating was exposed under an image and developed in Developer 3 to form a negative silver and yellow dye image. The silver image and the residual silver halide were removed by treatment with a conventional ferricyanide bleaching followed by a hypo fixing bath leaving a yellow negative image having a $\gamma$-max of 444 m$\mu$ and exhibiting good absorption characteristics.

Example X

Another film sample coated with the above emulsion in which an equal amount of Coupler 5 was used in place of Coupler 1 was exposed and given the same processing as was used in Example IX to produce a yellow dye image having a $\gamma$-max value of 444 m$\mu$ with very desirable absorption characteristics.

The dyes formed by the reaction of our couplers with oxidized color developer are characterized by having not only very desirable $\gamma$-max values but by having good stability to prolonged exposure to light and to heat. These characteristics are illustrated by the following table which lists the $\gamma$-max values and the amount of light fading produced by 30 hours exposure to an Xenon Arc Fadeometer and the amount of heat-fading produced by one week's storage at 140° F. and 75 percent relative humidity in density units.

TABLE I

| Coupler | Developer Formula | $\gamma$-max in m$\mu$ | Light Fading in Density Units Produced by 30 Hours Exposure to Xenon Arc Fadeometer | Heat Fading in Density Units Produced by 1 Week's Storage at 140° F. 75% RH |
|---|---|---|---|---|
| 1 | Developer 2 | 448 | .60 | .0 |
| 1 | Developer 3 | 444 | .58 | .02 |
| 2 | Developer 1 | 440 | .12 | .14 |
| 3 | do | 447 | .36 | .02 |
| 4 | do | 450 | --- | --- |
| 5 | Developer 2 | 448 | .13 | .0 |
| 5 | Developer 3 | 444 | .11 | .0 |

From this table it can be seen that Couplers 2, 3, and 5 produce dyes which are particularly stable to prolonged exposure to very strong light. The dyes from Couplers 1, 3, and 5 are particularly stable to prolonged exposure to heat at high humidity. Couplers 1 and 5 show no fading at all as a result of the exposure given.

The photographic emulsions incorporating our couplers show a high stability to "printout" and "yellowing." The following table will illustrate these very desirable properties shown by our Couplers 1 and 5.

TABLE II

| Coupler | "Printout" Measured in Change in Light Transmission Produced by 30 Hours Exposure to Xenon Arc Fadeometer | "Yellowing" Measured in Change in Light Transmission Produced by One Week's Storage at 140° F., 75% RH |
|---|---|---|
| 1 | 1½% decrease | 0 |
| 5 | 1% increase | 0 |

From this table it can be seen that only a very small amount of "printout" was produced by 30 hours of exposure to the Xenon Arc Fadeometer and that no "yellowing" was produced at all by storage at 140° F. and 75 percent RH.

The monofluoro couplers of our invention are distinguished from the corresponding monochloro coupler derivatives by not producing yellow fog in the yellow image layer during the development process which is characterisitc of many of the monochloro couplers.

Our couplers are not only valuable for the characteristics which have been described above but because they are two-equivalent. Two-equivalent couplers are particularly valuable for incorporation in photographic emulsion layers because the production of a given amount of dye with an emulsion coating of two-equivalent coupler requires only one-half the amount of silver halide that is required in an emulsion incorporating a conventional coupler. This means that not only can emulsions containing two-equivalent couplers be produced more economically but they can be made in thinner coatings. It is known that image definition and sharpness can be improved by reducing the thickness of image-bearing emulsion layers.

The novel fluorination process of our invention is characterized by providing a direct and simple method for producing valuable monofluorinated yellow-dye-forming couplers which have previously been impossible to make. The diffusing couplers of our invention are valuable for use in color developer solutions, while the nondiffusing couplers are valuable for incorporation in emulsion layers for color photography. Photographic emulsion layers containing our couplers are characterized by producing very low "printout" upon prolonged exposure to strong light and extremely little or no "yellowing" upon prolonged exposure to high temperatures and high humidity. The dyes formed by use of our yellow-dye-forming monofluorinated couplers have very desirable absorption characteristics and show good stability to prolonged exposure to strong light and high temperatures at high humidities. Our couplers are distinguished from the corresponding monochloro couplers by not producing yellow fog during the development process that is characteristic of many of the monochloro couplers.

This invention has been described in detail with particular reference to preferred embodiments thereof but it will be understood that variations and modifications can be effected within the spirit and scope of the invention as described hereinabove and as defined in the appended claims.

We claim:
1. The process for producing a compound of the formula:

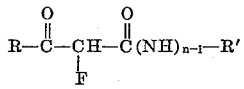

in which R represents a group selected from the class consisting of phenyl, alkphenyl in which the alkyl moiety has from 1 to 18 carbon atoms, alkoxyphenyl in which the alkyl moiety has from 1 to 18 carbon atoms, halophenyl, 3[α-(2,4-di-tert-amylphenoxy)butyramido]phenyl, primary alkyl having from 1 to 18 carbon atoms, secondary alkyl having from 3 to 32 carbon atoms, tertiary alkyl having from 4 to 32 carbon atoms, alkoxy tertiary alkyl having from 4 to 32 carbon atoms, alkylcyclohexyl in which the alkyl group has from 1 to 18 carbon atoms, alkoxyalkyl cyclohexyl in which the alkoxyalkyl group has from 2 to 18 carbon atoms, phenylcyclohexyl, tolylcyclohexyl; $n$ is an integer of from 1 to 2; and R' represents a group selected from the class consisting of alkyl having from 1 to 18 carbon atoms, alkoxy having from 1 to 18 carbon atoms, phenyl, halophenyl, 2-halo-5-alkamidophenyl, 2 - methoxy-5-alkamidophenyl, 4-alkamidophenyl, 4-methoxyphenyl, 4-sulfamylphenyl, 2-chloro - 5 - sulfonamidophenyl, 3,5-dicarboxyphenyl, alkyl esters of 3,5-dicarboxyphenyl in which the alkyl moieties each have from 1 to 18 carbon atoms, and 2-phenoxy-5-carbamylphenyl; said process comprising the step of adding (1) an alkali metal enolate of a coupler of the formula:

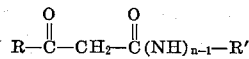

wherein R, R' and $n$ are as defined previously, to (2) an methanolic solution of perchloryl fluoride maintained at a temperature in the range of from about −45° C. to about −20° C., said process producing substantially no difluorinated product.

2. The process for producing a compound of the formula:

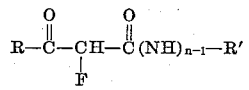

in which R represents a group selected from the class consisting of phenyl, alkphenyl in which the alkyl moiety has from 1 to 18 carbon atoms, alkoxyphenyl in which the alkyl moiety has from 1 to 18 carbon atoms, halophenyl, 3-[α-(2,4-di-tert-amylphenoxy)butyramido]phenyl, primary alkyl having from 1 to 18 carbon atoms, secondary alkyl having from 3 to 32 carbon atoms, tertiary alkyl having from 4 to 32 carbon atoms, alkoxy tertiary alkyl having from 4 to 32 carbon atoms, alkylcyclohexyl in which the alkyl group has from 1 to 18 carbon atoms, alkoxycyclohexyl in which the alkoxy group has from 1 to 18 carbon atoms, alkoxyalkylcyclohexyl in which the alkoxyalkyl group has from 2 to 18 carbon atoms, phenylcyclohexyl, tolylcyclohexyl; $n$ is an integer of from 1 to 2; and R' represents a group selected from the class consisting of alkyl having from 1 to 18 carbon atoms, alkoxy having from 1 to 18 carbon atoms, phenyl, halophenyl, 2-halo-5-alkamidophenyl, 2-methoxy-5-alkamidophenyl, 4-alkamidophenyl, 4-methoxyphenyl, 4-sulfamylphenyl, 2-chloro-5-sulfonamidophenyl, 3,5-dicarboxyphenyl, alkyl esters of 3,5-dicarboxyphenyl in which the alkyl moieties each have from 1 to 18 carbon atoms, and 2-phenoxy-5-carbamylphenyl; said process comprising the steps of: (1) absorbing perchloryl fluoride in methyl alcohol at −20° C., (2) adding to said methyl alcohol perchloryl fluoride solution held at a temperature of from −20° C. to −45° C., a solution prepared by reacting sodium methoxide in methyl alcohol with a compound of the formula:

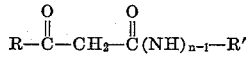

wherein R, R' and $n$ are as defined previously, said process producing substantially no difluorinated product.

3. The process for producing α-{3-[α-(2,4-di-tert-amylphenoxy)butyramido]benzoyl} - α - fluoro-2-methoxyacetanilide comprising the steps of absorbing perchloryl fluoride in methyl alcohol at −20° C. and adding to this solution held at a temperature of from −20° to −45° C. a solution prepared by reacting sodium methoxide in methyl alcohol with α-{3-[α-(2,4-di-tert-amylphenoxy)butyramido]benzoyl}-2-methoxyacetanilide.

4. The process for producing α-benzoyl-α-fluoroacetanilide comprising the steps of absorbing perchlorly fluoride in methyl alcohol at −20° C. and adding to this solution held at a temperature of from −20° to −45° C. a solution prepared by reacting sodium methoxide in methyl alcohol with α-benzoylacetanilide.

5. The process for producing α-benzoyl-α-fluoro-2-methoxyacetanilide comprising the steps of absorbing perchloryl fluoride in methyl alcohol at −20° C. and add- to this solution held at a temperature of from −20° to −45° C. a solution prepared by reacting sodium methoxide in methyl alcohol with α-benzoyl-2-methoxyacetanilide.

6. The process for producing ethyl-α-benzoyl-α-fluoroacetate comprising the steps of absorbing perchloryl fluoride in methyl alcohol at −20° C. and adding to this solution held at a temperature of from −20° C. to −45° C. a solution prepared by reacting sodium methoxide in methyl alcohol with ethyl-α-benzoylacetate.

7. The process for producing α-fluoro-α-pivalyl-5-[γ-(2,4 - di-tert-amylphenoxy)butyramido] - 2 - chloroacetanilide comprising the steps of absorbing perchloryl fluoride in methyl alcohol at −20° C. and adding to this solution held at a temperature of from −20° to −45° C. a solution prepared by reacting sodium methoxide in methyl alcohol with α - pivalyl-5 - [γ-(2,4-di-tert-amylphenoxy)butyramido]-2-chloroacetanilide.

8. A compound of the formula:

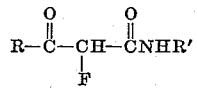

wherein R represents a group selected from the class consisting of phenyl, alkphenyl in which the alkyl moiety has from 1 to 18 carbon atoms, alkoxyphenyl in which the alkyl moiety has from 1 to 18 carbon atoms, halophenyl, 3[α-(2,4-di-tert-amylphenoxy)butyramido]phenyl, primary alkyl having from 1 to 18 carbon atoms, secondary alkyl having from 3 to 32 carbon atoms, tertiary alkyl having from 4 to 32 carbon atoms, alkoxy tertiary alkyl having from 4 to 32 carbon atoms, alkylcyclohexyl in which the alkyl group has from 1 to 18 carbon atoms, alkoxycyclohexyl in which the alkoxy group has from 1 to 18 carbon atoms, alkoxyalkylcyclohexyl in which the alkoxyalkyl group has from 2 to 18 carbon atoms, phenylcyclohexyl, tolylcyclohexyl, 7,7-dimethylnorbornyl, 2-alkyl-7,7-dimethylnorbornyl in which the said alkyl moiety has from 1 to 18 carbon atoms, 2-alkoxy-7,7-dimethylnorbornyl in which the said alkoxy moiety has from 1 to 18 carbon atoms, 2-alkoxyalkyl-7,7-dimethylnorbornyl in which the said alkoxyalkyl moiety has from 2 to 18 carbon atoms; and R′ represents a group selected from the class consisting of alkyl having from 1 to 18 carbon atoms, alkoxy having from 1 to 18 carbon atoms, phenyl, halophenyl, 2-halo-5-alkamidophenyl, 2-methoxy-5-alkamidophenyl, 4-alkamidophenyl, 4-methoxyphenyl, 4-sulfamylphenyl, 2-chloro-5-sulfonamidophenyl, 3,5-dicarboxyphenyl, alkyl esters of 3,5-dicarboxyphenyl in which the alkyl moieties each have from 1 to 18 carbon atoms, and 2-phenoxy-5-carbamylphenyl.

9. The yellow-dye-forming coupler, α-{3-[α-(2,4-di-tert-amylphenoxy)butyramido]benzoyl} - α - fluoro - 2-methoxyacetanilide.

10. The yellow-dye-forming coupler, α - benzoyl - α-fluoroacetanilide.

11. The yellow-dye-forming coupler, α - benzoyl - α-fluoro-2-methoxyacetanilide.

12. The yellow-dye-forming coupler, α-fluoro-α-pivalyl -5 - [γ - (2,4 - di - tert - amylphenoxy)butyramido]-2-chloroacetanilide.

References Cited by the Examiner

UNITED STATES PATENTS

| | | | |
|---|---|---|---|
| 2,728,658 | 12/1955 | McCrossen et al. | 96—55 |
| 2,744,933 | 5/1956 | Ehm | 260—562 |
| 2,772,162 | 11/1956 | Salminen et al. | 260—559 |
| 2,802,855 | 8/1957 | Whetstone et al. | 260—461 |
| 2,895,826 | 7/1959 | Salminen et al. | 96—55 |
| 2,897,079 | 7/1959 | De Cat et al. | 96—55 |
| 2,941,002 | 6/1960 | Erhart et al. | 260—562 |
| 2,953,576 | 9/1960 | Corby | 96—100 |
| 3,030,408 | 4/1962 | Inman et al. | 260—475 |
| 3,077,403 | 2/1963 | Trucker | 260—558 |

FOREIGN PATENTS

| | | |
|---|---|---|
| 934,229 | 9/1955 | Germany. |
| 991,453 | 10/1951 | France. |

OTHER REFERENCES

Alphen: Chem. Abstracts, vol. 41, pp. 407–9 (1947).

Bergmann et al.: J. Chem. Soc. (London), 1959 pp. 3278–85.

Blomquist et al.: J. Am. Chem. Soc., vol. 70, pp. 29–30 (1948).

Inman et al.: J. Am. Chem. Soc., vol. 80, pp. 6533–5 (1958).

Kitano et al.: Chem. Abstracts, vol. 50 p. 4108 (1956).

Vittum et al.: Jour. Photo Sci., vol. 6, pp. 157–169 (Nov./Dec. 1958).

WALTER A. MODANCE, *Primary Examiner.*

PHILIP E. MANGAN, DUVAL McCUTCHEN,
*Examiners.*

NICHOLAS S. RIZZO, R. A. BURROUGHS, A. D. ROLLINS, R. L. PRICE, N. TRUOUSOF,
*Assistant Examiners.*